3,366,455
USE OF INERT GAS FOR SULFUR PLANT
STARTUP AND SHUTDOWN
Lloyd E. Childers, Edgewood, Tex., and Howard Grekel and Lorenz V. Kunkel, Tulsa, Okla., assignors to Pan American Petroleum Corporation, Tulsa, Okla., a corporation of Delaware
Filed Aug. 17, 1966, Ser. No. 573,019
10 Claims. (Cl. 23—225)

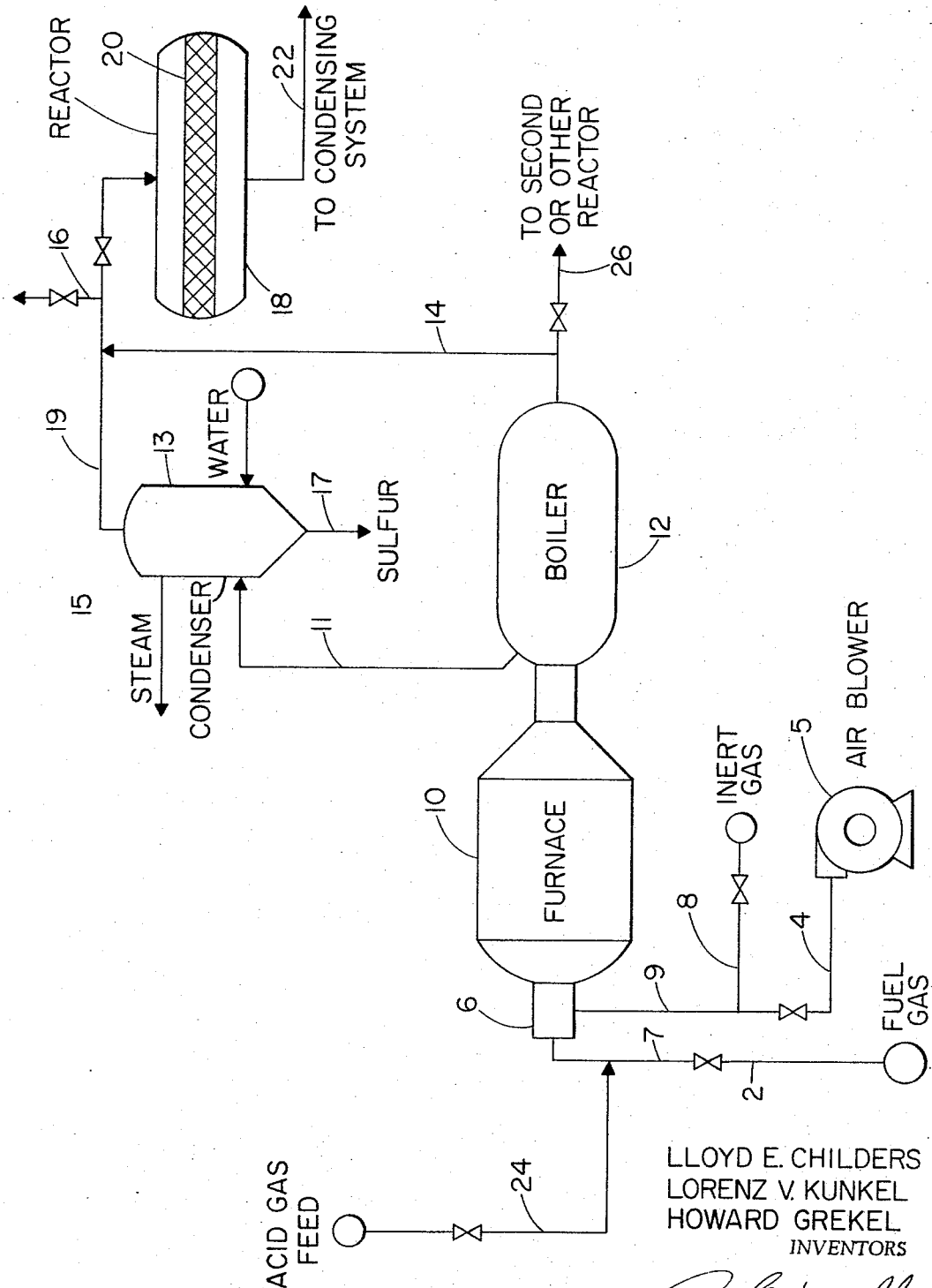

ABSTRACT OF THE DISCLOSURE

An inert gas such as nitrogen or carbon dioxide is used to permit safer and more rapid catalyst warmup and cooling, and to cool the refractory at a controlled rate without creating fires in catalyst beds.

---

The present invention relates to the manufacture of free sulfur from hydrogen sulfide-containing gases. More particularly it is concerned with improvements in the overall operating efficiency of this process.

The investment involved in sulfur recovery plants generally ranges from about $100,000 for units having a capacity of about ten tons/day to in excess of $1,000,000 for plants recovering 500 tons or more a day. Accordingly, from the standpoint of economics, it is of extreme importance that only a minimum of down time is experienced if a proper return on such an investment is to be realized. One of the difficulties encountered in this regard is the time required for starting up or shutting down and restarting a plant of this kind. The larger the plant, the greater the sulfur production loss per idle day.

In the startup procedure the catalyst bed or beds generally must be heated to a temperature of about 400° to 450° F. To accomplish this object, however, usually requires—for the larger plants at least—from two to three days because of the low controlled firing rate which employs only from 10 to 15 percent of design air in order to allow radiation cooling to reduce the gas temperature and protect the refractory lining of the furnace. While the catalyst beds, of course, could be heated to the desired temperature level faster if higher firing rates were used, such an operation can only be done at the risk of destroying the furnace refractory which usually melts at temperatures of the order of about 2700° to 3000° F. The use of excess air to reduce the flame temperature is not possible because of the danger of sulfur fires and excessive corrosion.

Even longer periods of time are required when it is desired to shut down a sulfur recovery plant for inspection or repairs. In such cases the hot refractory lining of the furnace is cooled by radiation. For example, a furnace large enough to process gas streams yielding approximately 300 tons of sulfur per day ordinarily requires about 6 days to cool down to a temperature level, i.e., about 300° F., at which the free sulfur therein will not ignite on contact with air. Thereafter an air blower can be used to cool the furnace sufficiently to permit inspection. Usually such shut downs are necessary about once a year thus losing from 7 to about 10 operating days per year.

In the drawings:

FIGURE 1 is a schematic representation of a single train sulfur plant of the type contemplated herein showing modifications required in a conventional plant to employ the present invention.

Accordingly, it is an object of our invention to provide a procedure for bringing the temperature of the catalyst beds in a sulfur plant reactor up to 400° to 450° F. within a relatively short time without damaging the refractory lining of the furnace. It is another object of our invention to provide a method for cooling the refractory lining of the furnace more rapidly so that the overall period required for shutdown of a sulfur plant is materially reduced.

Briefly, these and other objects of our invention are accomplished by the use of suitable inert gases such as nitrogen, carbon dioxide, steam, etc. In the plant startup procedure an inert gas such as nitrogen is mixed with the combustion air in an amount corresponding to from about 5 to about 50 percent of the air. This permits increasing the volume of gases passing through the system which in turn enables more heat to be transmitted per unit of time to the catalyst beds. In effecting the heating step, the combustion air is diluted with a quantity of inert gas within the range just indicated thus reducing the flame temperature below 2700° F. while firing the furnace on fuel gas at, for example, 20 to 40 percent of design air rate—which in the case of a sulfur recovery unit producing approximately 300 tons per day—may range from about 180,000 to about 360,000 s.c.f.h. Heating of the catalyst beds under such conditions is from about 4 to about 6 times faster than is normally possible, owing to the substantially higher firing rates with the diluted gas. Products of combustion are preferably vented to the atmosphere at the inlet of the first condenser during refractory warm up to avoid fouling catalyst beds with water or carbon produced at low firing rates.

Although nitrogen has been used in these catalyst bed warm up procedures, liquid carbon dioxide, as previously mentioned, is also suitable. Moreover, it is ordinarily readily available and can be obtained at about one-half the cost of nitrogen. Carbon dioxide, customarily available in liquid form, when used in the process of our invention requires a suitable vaporizer to permit it to be vaporized and superheated. The warm carbon dioxide (100° F.) is introduced into the combustion air stream used for warm up. A carbon dioxide ratio of 0.17 s.c.f./s.c.f. combustion air is generally recommended for injection into combustion air to reduce flame temperature by about 500° F. With nitrogen at 100° F. the corresponding ratio should be about 0.22 s.c.f./s.c.f. combustion air to obtain a similar reduction in temperature.

When it is desired to shut down the plant, the flow of acid gas can be stopped and inert gas or steam fed to the furnace. In the case of steam, for example, the furnace refractory can be cooled at rates up to about 100° F. per hour if the lines to the reactors are closed to prevent entry of water and if the steam used for cooling is vented to the atmosphere at the inlet of the first reactor. For example, in a 300 ton/day sulfur train, steam injection rates of from about 2000 pounds to about 10,000 pounds per hour, depending on the size of the furnace and the refractory temperature, are required to cool the refractory lining of the furnace to a temperature of about 300° F. in a period of about 24 hours. Nitrogen or carbon dioxide can be substituted for steam to cool down the refractory in approximately the same length of time.

To illustrate further how our invention may be used in the startup of a conventional single train sulfur plant, reference is made to FIGURE 1 of the drawings wherein 1000 B.t.u./s.c.f. fuel gas in line 2 and air in line 4, forced into the latter by means of blower 5, are introduced into burner 6 by means of lines 7 and 9, respectively, and ignited. Once a flame is established in the burner the temperature thereof is reduced by introducing an inert gas into the system via valved line 8 in an amount corresponding to, for example, 18 percent of the combustion air. Under these conditions, the resulting flame temperature is below 2700° F., which is the approximate melting point of the refractory in furnace 10. The gases of combustion now at a temperature of from about 2000° to 2500° F. are withdrawn from the furnace and passed through boiler 12 to produce 300-pound steam. A portion of the boiler effluent is taken off at a temperature of about 800° F. through valved line 14, the remainder being removed through line 11 at about 400° F. This 400° gas flows into condenser 13 and is cooled to about 300° F. forming steam at 50 lbs./sq. inch gage pressure, which is withdrawn through line 15. The cooled gas in line 19 is then mixed with the 800° F. gas in line 14 to produce a mixture, having a temperature of about 500° F., which is then introduced into reactor 18, where catalyst in bed 20 is brought up to the desired temperature level of 400° to 450° F. Thereafter the gases are conducted from the reactor system via line 22. If the plant has more than one reactor, hot gases from line 14 may be taken via valved line 26, mixed with cooled gas from line 22, and the resulting mixture used to bring the additional reactor up to the desired temperature as described above. Once the catalyst has reached 400° to 450° F., acid gas containing hydrogen sulfide is gradually fed into the system via valved line 24 and fuel gas flow through line 2 is slowly terminated so as to provide an uninterrupted transition to the conversion of hydrogen sulfide into free sulfur, and the inert gas flow shut off.

When it is desired to shut down the unit for inspection or for other reasons, essentially the reverse of the above procedure is used. The flow of hydrogen sulfide into the furnace via lines 24 and 7 and the air flow into the furnace via lines 4 and 9 are shut off. The valve in line 16 is opened to the atmosphere and the valve in the inlet line to the reactor is closed. Thereafter, inert gas or steam is introduced into the system via lines 8 and 9, with the valve in line 4 closed. Steam or inert gas injection is continued until the furnace refractory lining has cooled down to a temperature of about 300° F. after which further cooling is effected by introducing air into the furnace via lines 4 and 9 with the aid of a blower 5.

A detailed example of our invention is further illustrated in the following procedure for shut down and warm up of one train of a dual train, 600 tons/day sulfur recovery plant.

For shutdown, the air and acid gas flows are first shut off and flanges closed to separate the active train from the shut down train. The reactors are then isolated from the boiler and a vent opened to allow steam to vent downstream from the boiler.

Then, steam is introduced into the furnace at a rate of 3000 lbs. per hour to cool the furnace at a rate not to exceed 100° F. per hour. The steam rate is increased as furnace temperatures decrease until a rate of 10,000 pounds per hour is reached when the furnace temperature is about 400° F. After temperatures are down to 300° F. in the furnace, air is used to complete the cooling.

For startup, the refractory is rewarmed at a rate not exceeding 100° F. per hour burning fuel gas with stoichiometric air at rates up to about 5% of design air rate, venting combustion gas from the boiler to the atmosphere. After about 24 hours, the refractory is at a temperature of about 2000° F. The isolation valve is now opened and warmup of catalyst is begun. Fuel gas (1100 B.t.u./s.c.f.) is burned at a rate of 370 s.c.f.m., with a mixed stream of air and nitrogen introduced at a rate of 4,000 and 600 s.c.f.m., respectively. The effluent from the boiler heats the catalyst to the desired temperature within a period of about 10 hours.

The following compares the average times required for cool-down, inspection, refractory warming and catalyst warmup by two methods.

| | Cool Furnace by Radiation. Warm up catalyst at about 10% of Sulfur Plant Design Air Rate, hours | Use Steam to cool Refractory. Use Nitrogen to Moderate Catalyst warm up at about 25% of Sulfur Plant Design Air Rate, hours |
| --- | --- | --- |
| Cool Refractory to 300° F | 144 | 24 |
| Air Cool Refractory to 100° F., inspect | 24 | 24 |
| Warm Up Refractory Low Rate Fuel Gas Fire | 24 | 24 |
| Warm Up Catalyst to 400°–450° F | 48 | 10 |
| Total | ¹ 240 | ² 82 |

¹ 10 days.
² 3 days, 10 hours.

Thus, the plant may be placed into production about 6½ days earlier when techniques using inert gas and steam are utilized and approximately 1950 tons more sulfur per train can be produced, because production can be begun earlier.

From the foregoing description it will be apparent that a very substantial savings in down time, together with a corresponding reduction in loss of income from sulfur recovery units, has been made possible through the use of our invention. Specifically, our invention is to be construed to cover the use of any diluent in the burner fuel during startup to effect a more rapid approach to operating temperature in the reactors. Likewise, it includes the use of any suitable inert gas or steam as a medium for accelerating the removal of heat from a sulfur plant furnace, all as described herein. In this connection, the expression "inert gas" as employed in the present description and claims is intended to include steam. Also, a minor amount of liquid sulfur may be employed in combination with steam or other inert gas to extract heat from the furnace during the cool-down step.

It should be further understood that the process of our invention is applicable to sulfur recovery plants employing either the "split flow" or the "straight-through" methods in which there is a line provided for conducting hot gas from the boiler to each of the reactors for preheat purposes. As is well known in the art, the first-mentioned procedure involves diverting approximately one-third of the acid gas feed into a furnace where it is burned completely to sulfur dioxide after which the effluent is combined with the remaining two-thirds of said feed, bringing the resulting mixture containing sulfur dioxide and hydrogen sulfide, roughly in stoichiometric proportions, in contact with a suitable catalyst at reaction temperatures to produce free sulfur. In the straight-through embodiment, all of the acid gas feed goes through the furnace together with enough oxygen to convert only about one-third of the hydrogen sulfide in the feed to sulfur dioxide. Thereafter the effluent from the furnace in the straight-through process is introduced into a boiler, then part of the gas passed through a sulfur condenser and the remainder bypassed to blend with the condenser effluent and the mixture introduced into a catalytic converter where the hydrogen sulfide and sulfur dioxide are transformed into free sulfur under conditions identical to the corresponding stage of the split flow procedure mentioned above.

We claim:

1. In a method for the recovery of free sulfur from a gaseous mixture containing hydrogen sulfide which method includes the burning of said hydrogen sulfide with air in a refractory lined combustion zone to produce sulfur dioxide, and subsequently reacting the latter with hydrogen sulfide in a reaction zone in contact with a catalyst to produce free sulfur, the improvement which comprises burning a combustible mixture consisting essentially of air, an inert gas, and a combustible gas in said combustion zone prior to the production of sulfur dioxide therein, said inert gas being present in the combustion air in a concentration ranging from about 5 to about 50 percent, and thereafter bringing the resulting hot products of combustion into contact with said catalyst until the latter is heated to a temperature of from about 400° to about 450° F.

2. The method of claim 1 wherein said combustion zone is fired on combustible gas at from about 5 to about 40 percent of the sulfur recovery process design air rate.

3. The method of claim 1 in which the inert gas employed is nitrogen.

4. The method of claim 1 in which the inert gas employed is carbon dioxide.

5. The method of claim 1 in which the inert gas employed is steam.

6. The method of claim 1 wherein said sulfur production step is discontinued while said combustion zone is at a temperature above about 2000° F. but below the melting point of said refractory lining, and thereafter cooling said refractory lining at the rate of at least 50° F. per hour by injecting an inert gas into said zone until the temperature of the latter is not more than about 300° F.

7. The method of claim 6 wherein a minor amount of liquid sulfur is employed in combination with said inert gas during the cool-down step.

8. The method of claim 6 in which the inert gas employed is nitrogen.

9. The method of claim 6 in which the inert gas employed is carbon dioxide.

10. The method of claim 6 in which the inert gas employed is steam.

References Cited
UNITED STATES PATENTS

| | | | |
|---|---|---|---|
| 2,266,095 | 12/1941 | Thayer | 23—1 X |
| 2,834,653 | 5/1958 | Fleming | 23—225 |
| 2,850,352 | 9/1958 | Odell | 23—225 X |
| 3,154,383 | 10/1964 | Froning et al. | 23—225 |

OSCAR R. VERTIZ, *Primary Examiner.*

G. PETERS, *Assistant Examiner.*